(12) United States Patent
Tang et al.

(10) Patent No.: US 11,603,914 B2
(45) Date of Patent: Mar. 14, 2023

(54) CONTINUOUSLY VARIABLE TRANSMISSION

(71) Applicant: WEIHAI TUANZHONG TRANSMISSION CO., LTD., Weihai (CN)

(72) Inventors: Yongfeng Tang, Weihai (CN); Yuning Tang, Weihai (CN)

(73) Assignee: WEIHAI TUANZHONG TRANSMISSION CO., LTD., Weihai (CN)

(*) Notice: Subject to any disclaimer, the term of this patent is extended or adjusted under 35 U.S.C. 154(b) by 84 days.

(21) Appl. No.: 17/430,640

(22) PCT Filed: Feb. 5, 2020

(86) PCT No.: PCT/CN2020/074341
§ 371 (c)(1),
(2) Date: Aug. 12, 2021

(87) PCT Pub. No.: WO2020/168911
PCT Pub. Date: Aug. 27, 2020

(65) Prior Publication Data
US 2022/0243795 A1   Aug. 4, 2022

(30) Foreign Application Priority Data
Feb. 21, 2019  (CN) .......................... 201910128142.9

(51) Int. Cl.
*F16H 47/12* (2006.01)
*F16H 57/021* (2012.01)
*F16H 57/031* (2012.01)

(52) U.S. Cl.
CPC ........... *F16H 47/12* (2013.01); *F16H 57/021* (2013.01); *F16H 57/031* (2013.01); *F16H 2057/0216* (2013.01)

(58) Field of Classification Search
CPC ................................. F16H 47/12; F16H 33/16
(Continued)

(56) References Cited

U.S. PATENT DOCUMENTS

| | | | | |
|---|---|---|---|---|
| 1,933,143 A | * | 10/1933 | Janssen | F16H 33/16 475/112 |
| 2,293,547 A | * | 8/1942 | Hobbs | F16H 47/12 475/111 |

(Continued)

FOREIGN PATENT DOCUMENTS

| | | | | |
|---|---|---|---|---|
| CH | 615004 A | * | 12/1979 | ............ F16H 47/12 |
| DE | 452368 C | * | 11/1927 | |
| WO | 2011154921 A2 | | 12/2011 | |

OTHER PUBLICATIONS

ISR of the counterpart PCT application No. PCT/CN2020/074341 by ISA/CN dated Apr. 23, 2020.

*Primary Examiner* — Sherry L Estremsky
(74) *Attorney, Agent, or Firm* — Platinum Intellectual Property PC (57) ABSTRACT

A continuously variable transmission. The continuously variable transmission is provided with an outer housing (1), an inner cavity (2), a first planetary gear set (4), and a second planetary gear set (7). A bucket wheel sun gear (1001) is fixedly provided on a first shaft (3) that penetrates through a first support (5); the bucket wheel sun gear is located at the inner side of the first support; a bucket wheel planetary gear (1002) is provided on the outer circumference of the bucket wheel sun gear; the bucket wheel planetary gear is engaged with the bucket wheel sun gear; the bucket wheel planetary gear and the bucket wheel sun gear constitute a bucket wheel planetary gear set (10); a third support (11) is provided adjacent to the bucket wheel sun gear; a bucket wheel planetary gear shaft (14) is fixedly provided in the middle of the bucket wheel planetary gear; the interior of the bucket (Continued)

wheel planetary gear shaft is a hollow structure; a planetary gear shaft (12) penetrates through the first support, the hollow bucket wheel planetary gear shaft, and the second support; the planetary gear shaft is separately and rotatably connected with the first support and the second support. Provided is a continuously variable transmission having three control ends formed of the outer housing, the first shaft, and a second shaft (6).

7 Claims, 6 Drawing Sheets

(58) Field of Classification Search
USPC .......................................................... 475/112
See application file for complete search history.

(56) References Cited

U.S. PATENT DOCUMENTS

| | | | |
|---|---|---|---|
| 5,062,823 A | 11/1991 | Ra et al. | |
| 2022/0107017 A1* | 4/2022 | Tang | ........................ F16H 47/12 |

* cited by examiner

CONTINUOUSLY VARIABLE TRANSMISSION

RELATED APPLICATIONS

This application is a United States National Stage Application filed under 35 U.S.C 371 of PCT Patent Application Serial No. PCT/CN2020/074341, filed Feb. 5, 2020, which claims Chinese Patent Application Serial No. CN 201910128142.9, filed Feb. 21, 2019, the disclosure of all of which are hereby incorporated by reference in their entirety.

BACKGROUND OF THE INVENTION

Field of the Invention

The present invention relates to a mechanical transmission apparatus, and in particularly to a continuously variable transmission.

Description of the Related Art

An existing continuously variable transmission proposed in Chinese granted patent ZL2017205424112 has following technical solutions: a continuously variable transmission includes an input end planet gear set and an output end planet gear set, a cavity planet carrier is provided between the input end planet gear set and the output end planet gear set, the cavity planet carrier includes a cavity input end cover and a cavity output end cover, a bucket wheel cavity housing is fixedly provided between the cavity input end cover and the cavity output end cover, the inside of the input end planet gear set is connected to the cavity input end cover, the inside of the output end planet gear set is connected to the cavity output end cover, a bucket wheel planet gear set is provided on one side of inside of the bucket wheel cavity housing close to the cavity input end cover, a planet gear connecting shaft is provided in the middle of an input end planet gear, the planet gear connecting shaft passes through and is rotatably connected to the cavity input end cover, the planet gear connecting shaft passes through and is rotatably connected to the cavity output end cover, and an output end planet gear is fixedly connected to the planet gear connecting shaft passing through the cavity output end cover; the bucket wheel planet gear set includes a bucket wheel sun gear and a bucket wheel planet gear, a bucket wheel planet gear shaft is provided in the middle of the bucket wheel planet gear, one end of the bucket wheel planet gear shaft is provided on the cavity input end cover, the other end of the bucket wheel planet gear shaft is provided with a bucket wheel, and the bucket wheel planet gear shaft passes through and is rotatably connected to a bushing. This patent mainly has the following shortcomings:

1. The revolution of the continuously variable transmission has the performance of being subjected to additional control. The planet gear sets at two ends of this technical solution are outside the cavity planet carrier, that is, outside the cavity input end cover and the cavity output end cover. The planet gear sets at two ends limit the positions of the end covers, and it is difficult to control the revolution of the end covers on two sides of the cavity planet carrier.

2. The cavity planet carrier of the continuously variable transmission contains oil therein and has the condition for oil-rich lubrication. The planet gear sets at two ends of this technical solution are outside the cavity planet carrier, that is, outside the cavity input end cover and the cavity output end cover. The engagement transmission of gears of the planet gear sets at two ends is oil-lean lubricated and has loud noise.

3. The planet gear shaft and the bucket wheel planet gear shaft of the continuously variable transmission are not coaxial, the planet gear shaft is outside the center of the bucket wheel planet gear shaft, and this structure arrangement is complex.

4. The continuously variable transmission has different transmission performances formed by exchanging the input end and the output end, and adapts to different occasions. This technical solution fixes the input end and the output end, resulting in a single transmission performance.

5. The inner wall structure of the intermediate housing is a functional structure of the continuously variable transmission, and the shape thereof decides the torque transmission capacity of the bucket wheel. This technical solution does not have an inner wall structure solution of the intermediate housing.

6. When the torque transmission needs to be increased, in a case of unchanging other structures, the solution of replacing a sun gear with a gear ring is not provided to increase the torque transmission. The continuously variable transmission has complex structure, and cannot achieve multiple functions and satisfy different working conditions.

SUMMARY OF THE INVENTION

The present invention is to solve the technical problem that the planet gear sets at two ends of the continuously variable transmission limit the positions of the end covers, and it is difficult to control the revolution of the end covers on two sides of the cavity planet carrier; the engagement transmission of gears of the planet gear sets at two ends is oil-lean lubricated and has loud noise; the planet gear shaft and the bucket wheel planet gear shaft are not coaxial, the planet gear shaft is outside the center of the bucket wheel planet gear shaft, and this structure arrangement is complex; the input end and the output end are fixed, and the transmission performance is single; there is no inner wall structure solution of the intermediate housing, and in a case of unchanging other structures, there is no alternative solution of increasing the torque transmission. The present invention provides a continuously variable transmission which has multiple functions and satisfies different working conditions, wherein three control ends are formed by an outer housing, a first shaft and a second shaft, the gear engagement inside the outer housing is oil-rich lubricated, the planet gear shaft and the bucket wheel planet gear shaft are coaxial, a semicircular cavity corresponding to a bucket wheel is provided in an inner wall of the outer housing, the bucket wheel is located in the semicircular cavity, and the sun gear is replaced with the gear ring to increase torque transmission.

To this end, the technical solution of the present invention is a continuously variable transmission provided with an outer housing, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity; a first shaft penetrates in the middle of the first end cover, the first shaft is rotatably connected to the first end cover, a first sun gear is fixedly provided on the first shaft, the first sun gear is located inside the first end cover, the first sun gear is adjacently provided with a first support frame, the first shaft passes through the first support frame, and the first shaft is rotatably connected to the first support frame; a first planet gear is provided on an outer circumference of the first sun gear, the first planet gear is engaged with the first sun gear, and the first planet gear and the first sun gear constitute a first planet gear set; a second shaft penetrates in the middle of the second end cover, the second shaft is rotatably connected to the second end cover, a second sun gear is fixedly provided on the second shaft, the second sun gear is located inside the second end cover, the second sun gear is adjacently provided with a second support frame, a second planet gear is provided on an outer circumference of the second sun gear, the second planet gear is engaged with the second sun gear, and the second planet gear and the second sun gear constitute a second planet gear set; a bucket wheel sun gear is fixedly provided on the first shaft passing through the first support frame, the bucket wheel sun gear is located inside the first support frame, a bucket wheel planet gear is provided on an outer circumference of the bucket wheel sun gear, the bucket wheel planet gear is engaged with the bucket wheel sun gear, and the bucket wheel planet gear and the bucket wheel sun gear constitute a bucket wheel planet gear set; the bucket wheel sun gear is adjacently provided with a third support frame; a bucket wheel planet gear shaft is fixedly provided in the middle of the bucket wheel planet gear, the inside of the bucket wheel planet gear shaft is a hollow structure, the bucket wheel planet gear shaft passes through the third support frame, the bucket wheel planet gear shaft is rotatably connected to the third support frame, a bucket wheel is fixedly provided on the bucket wheel planet gear shaft passing through the third support frame, the bucket wheel is located between the second support frame and the third support frame, and the bucket wheels fixedly provided on a plurality of the bucket wheel planet gear shafts constitute a bucket wheel set; a planet gear shaft is fixedly provided in the middle of the first planet gear, the planet gear shaft passes through the first support frame, the hollow bucket wheel planet gear shaft and the second support frame, the planet gear shaft is rotatably connected to the first support frame and the second support frame respectively, and the planet gear shaft passing through the first support frame, the hollow bucket wheel planet gear shaft and the second support frame is fixedly connected to the second planet gear.

Preferably, a semicircular cavity is provided in a position corresponding to the bucket wheel in an inner wall of the outer housing, and the bucket wheel is located in the semicircular cavity.

Preferably, there are 3 or more first planet gears.

Preferably, there are 3 or more second planet gears.

Preferably, a central bucket wheel is fixedly provided on the first shaft or the second shaft, and the central bucket wheel is located between the second support frame and the third support frame.

A continuously variable transmission is provided with an outer housing, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity; a first shaft penetrates in the middle of the first end cover, the first shaft is rotatably connected to the first end cover, a first gear ring is fixedly provided on the first shaft, the first gear ring is located inside the first end cover, the first gear ring is adjacently provided with a first support frame, the first shaft passes through the first support frame, the first shaft is rotatably connected to the first support frame, a first planet gear is provided inside an outer circumference of the first gear ring, the first planet gear is engaged with the first gear ring, and the first planet gear and the first gear ring constitute a first planet gear set; a second shaft penetrates in the middle of the second end cover, the second shaft is rotatably connected to the second end cover, a second gear ring is fixedly provided on the second shaft, the second gear ring is located inside the second end cover, the second gear ring is adjacently provided with a second support frame, a second planet gear is provided inside an outer circumference of the second sun gear, the second planet gear is engaged with the second gear ring, and the second planet gear and the second gear ring constitute a second planet gear set; a bucket wheel sun gear is fixedly provided on the first shaft passing through the first support frame, the bucket wheel sun gear is located inside the first support frame, a bucket wheel planet gear is provided on an outer circumference of the bucket wheel sun gear, the bucket wheel planet gear is engaged with the bucket wheel sun gear, and the bucket wheel planet gear and the bucket wheel sun gear constitute a bucket wheel planet gear set; the bucket wheel sun gear is adjacently provided with a third support frame; a bucket wheel planet gear shaft is fixedly provided in the middle of the bucket wheel planet gear, the inside of the bucket wheel planet gear shaft is a hollow structure, the bucket wheel planet gear shaft passes through the third support frame, the bucket wheel planet gear shaft is rotatably connected to the third support frame, a bucket wheel is fixedly provided on the bucket wheel planet gear shaft passing through the third support frame, the bucket wheel is located between the second support frame and the third support frame, and the bucket wheels fixedly provided on a plurality of the bucket wheel planet gear shafts constitute a bucket wheel set; a planet gear shaft is fixedly provided in the middle of the first planet gear, the planet gear shaft passes through the first support frame, the hollow bucket wheel planet gear shaft and the second support frame, the planet gear shaft is rotatably connected to the first support frame and the second support frame respectively, and the planet gear shaft passing through the first support frame, the hollow bucket wheel planet gear shaft and the second support frame is fixedly connected to the second planet gear.

A continuously variable transmission is provided with an outer housing, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity; a first shaft penetrates in the middle of the first end cover, the first shaft is rotatably connected to the first end cover, a first sun gear is fixedly provided on the first shaft, the first sun gear is located inside the first end cover, the first sun gear is adjacently provided with a first support frame, the first shaft passes through the first support frame, and the first shaft is rotatably connected to the first support frame; a first planet gear is provided on an outer circumference of the first sun gear, the first planet gear is engaged with the first sun gear, and the first planet gear and the first sun gear constitute a first planet gear set; a second shaft penetrates in the middle of the second end cover, the second shaft is rotatably connected to the second end cover, a second gear ring is fixedly provided on the second shaft, the second gear ring is located inside the second end cover, the second gear ring is adjacently provided with a second support frame, a second planet gear is provided inside an outer circumference of the second gear ring, the second planet gear is engaged with the second gear ring, and the second planet gear and the second gear ring constitute a second planet gear set; a bucket wheel sun gear is fixedly provided on the first shaft passing through the first support frame, the bucket wheel sun gear is located inside the first support frame, a bucket wheel planet gear is provided on an outer circumference of the bucket wheel sun gear, the bucket wheel planet gear is engaged with the bucket wheel sun gear, and the bucket wheel planet gear and the bucket wheel sun gear constitute a bucket wheel planet gear set; the bucket wheel sun gear is adjacently provided with a third support frame; a bucket wheel planet gear shaft is fixedly provided in the middle of the bucket wheel planet gear, the inside of the bucket wheel planet gear shaft is a hollow structure, the bucket wheel planet gear shaft passes through the third support frame, the bucket wheel planet gear shaft is rotatably connected to the third support frame, a bucket wheel is fixedly provided on the bucket wheel planet gear shaft passing through the third support frame, the bucket wheel is located between the second support frame and the third support frame, and the bucket wheels fixedly provided on a plurality of the bucket wheel planet gear shafts constitute a bucket wheel set; a planet gear shaft is fixedly provided in the middle of the first planet gear, the planet gear shaft passes through the first support frame, the hollow bucket wheel planet gear shaft and the second support frame, the planet gear shaft is rotatably connected to the first support frame and the second support frame respectively, and the planet gear shaft passing through the first support frame, the hollow bucket wheel planet gear shaft and the second support frame is fixedly connected to the second planet gear.

A continuously variable transmission is provided with an outer housing, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity; a first shaft penetrates in the middle of the first end cover, the first shaft is rotatably connected to the first end cover, a first gear ring is fixedly provided on the first shaft, the first gear ring is located inside the first end cover, the first gear ring is adjacently provided with a first support frame, the first shaft passes through the first support frame, the first shaft is rotatably connected to the first support frame, a first planet gear is provided inside an outer circumference of the first gear ring, the first planet gear is engaged with the first gear ring, and the first planet gear and the first gear ring constitute a first planet gear set; a second shaft penetrates in the middle of the second end cover, the second shaft is rotatably connected to the second end cover, a second sun gear is fixedly provided on the second shaft, the second sun gear is located inside the second end cover, the second sun gear is adjacently provided with a second support frame, a second planet gear is provided on an outer circumference of the second sun gear, the second planet gear is engaged with the second sun gear, and the second planet gear and the second sun gear constitute a second planet gear set; a bucket wheel sun gear is fixedly provided on the first shaft passing through the first support frame, the bucket wheel sun gear is located inside the first support frame, a bucket wheel planet gear is provided on an outer circumference of the bucket wheel sun gear, the bucket wheel planet gear is engaged with the bucket wheel sun gear, and the bucket wheel planet gear and the bucket wheel sun gear constitute a bucket wheel planet gear set; the bucket wheel sun gear is adjacently provided with a third support frame; a bucket wheel planet gear shaft is fixedly provided in the middle of the bucket wheel planet gear, the inside of the bucket wheel planet gear shaft is a hollow structure, the bucket wheel planet gear shaft passes through the third support frame, the bucket wheel planet gear shaft is rotatably connected to the third support frame, a bucket wheel is fixedly provided on the bucket wheel planet gear shaft passing through the third support frame, the bucket wheel is located between the second support frame and the third support frame, and the bucket wheels fixedly provided on a plurality of the bucket wheel planet gear shafts constitute a bucket wheel set; a planet gear shaft is fixedly provided in the middle of the first planet gear, the planet gear shaft passes through the first support frame, the hollow bucket wheel planet gear shaft and the second support frame, the planet gear shaft is rotatably connected to the first support frame and the second support frame respectively, and the planet gear shaft passing through the first support frame, the hollow bucket wheel planet gear shaft and the second support frame is fixedly connected to the second planet gear.

Preferably, a semicircular cavity is provided in a position corresponding to the bucket wheel in an inner wall of the outer housing, and the bucket wheel is located in the semicircular cavity.

The benefit effects of the present invention are as follows. A continuously variable transmission provided with an outer housing, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity; a first shaft penetrates in the middle of the first end cover, the first shaft is rotatably connected to the first end cover, a first sun gear is fixedly provided on the first shaft, the first sun gear is located inside the first end cover, the first sun gear is adjacently provided with a first support frame, the first shaft passes through the first support frame, and the first shaft is rotatably connected to the first support frame; a first planet gear is provided on an outer circumference of the first sun gear, the first planet gear is engaged with the first sun gear, and the first planet gear and the first sun gear constitute a first planet gear set; a second shaft penetrates in the middle of the second end cover, the second shaft is rotatably connected to the second end cover, a second sun gear is fixedly provided on the second shaft, the second sun gear is located inside the second end cover, the second sun gear is adjacently provided with a second support frame, a second planet gear is provided on an outer circumference of the second sun gear, the second planet gear is engaged with the second sun gear, and the second planet gear and the second sun gear constitute a second planet gear set; a bucket wheel sun gear is fixedly provided on the first shaft passing through the first support frame, the bucket wheel sun gear is located inside the first support frame, a bucket wheel planet gear is provided on an outer circumference of the bucket wheel sun gear, the bucket wheel planet gear is engaged with the bucket wheel sun gear, and the bucket wheel planet gear and the bucket wheel sun gear constitute a bucket wheel planet gear set; the bucket wheel sun gear is adjacently provided with a third support frame; a bucket wheel planet gear shaft is fixedly provided in the middle of the bucket wheel planet gear, the inside of the bucket wheel planet gear shaft is a hollow structure, the bucket wheel planet gear shaft passes through the third support frame, the bucket wheel planet gear shaft is rotatably connected to the third support frame, a bucket wheel is fixedly provided on the bucket wheel planet gear shaft passing through the third support frame, the bucket wheel is located between the second support frame and the third support frame, and the bucket wheels fixedly provided on a plurality of the bucket wheel planet gear shafts constitute a bucket wheel set; a planet gear shaft is fixedly provided in the middle of the first planet gear, the planet gear shaft passes through the first support frame, the hollow bucket wheel planet gear shaft and the second support frame, the planet gear shaft is rotatably connected to the first support frame and the second support frame respectively, and the planet gear shaft passing through the first support frame, the hollow bucket wheel planet gear shaft and the second support frame is fixedly connected to the second planet gear. Therefore, in terms of structure, the outer housing, the first shaft and the second shaft of the device form three control ends, and when the transmission torque capacity is insufficient, the function of the third control end participating in braking and the like will greatly improve the performance of the continuously variable transmission; the gear engagement has oil-rich lubrication; the inside of the bucket wheel planet gear shaft is hollow, the planet gear shaft passes through the hollow bucket wheel planet gear shaft, the planet gear shaft and the bucket wheel are coaxial, and the inner cavity has a compact structure; the gear ring can replace the sun gear, which greatly improves the torque transmission performance; the bucket wheel is located in the semicircular cavity on the inner wall of the outer housing, and the hydrodynamic force and the hydrodynamic viscous force of the bucket wheel will exert more effective performance; multiple functions and high performance of the continuously variable transmission can be achieved and different working conditions are satisfied.

SYMBOLS IN THE DRAWINGS 1. outer housing; 101. intermediate housing; 102. first end cover; 103. second end cover; 2. inner cavity; 3. first shaft; 4. first planet gear set; 401. first sun gear; 401A. first gear ring; 402. first planet gear; 5. first support frame; 6. second shaft; 7. second planet gear set; 701. second sun gear; 701A. second gear ring; 702. second planet gear; 8. second support frame; 9. bucket wheel set; 901. bucket wheel; 10. bucket wheel planet gear set; 1001. bucket wheel sun gear; 1002. bucket wheel planet gear; 11. third support frame; 12. planet gear shaft; 13. central bucket wheel; 14. bucket wheel planet gear shaft.

DESCRIPTION OF THE EMBODIMENTS

The present invention will be further described below in conjunction with the embodiments.

Embodiment 1

FIGS. 1-6 show an embodiment of a continuously variable transmission of the present invention. The continuously variable transmission is provided with an outer housing 1, an intermediate housing 101 is provided in the middle of the outer housing 1, a first end cover 102 and a second end cover 103 are respectively provided on both sides of the intermediate housing 101, the inside of the intermediate housing 101 is a cavity structure, and the cavity inside the intermediate housing 101 and insides of the first end cover 102 and the second end cover 103 form an inner cavity 2; a first shaft 3 penetrates in the middle of the first end cover 102, the first shaft 3 is rotatably connected to the first end cover 102, a first sun gear 401 is fixedly provided on the first shaft 3, the first sun gear 401 is located inside the first end cover 102, the first sun gear 401 is adjacently provided with a first support frame 5, the first shaft 3 passes through the first support frame 5, and the first shaft 3 is rotatably connected to the first support frame 5; a first planet gear 402 is provided on an outer circumference of the first sun gear 401, the first planet gear 402 is engaged with the first sun gear 401, and the first planet gear 402 and the first sun gear 401 constitute a first planet gear set 4; a second shaft 6 penetrates in the middle of the second end cover 103, the second shaft 6 is rotatably connected to the second end cover 103, a second sun gear 701 is fixedly provided on the second shaft 6, the second sun gear 701 is located inside the second end cover 103, the second sun gear 701 is adjacently provided with a second support frame 8, a second planet gear 702 is provided on an outer circumference of the second sun gear 701, the second planet gear 702 is engaged with the second sun gear 701, and the second planet gear 702 and the second sun gear 701 constitute a second planet gear set 7; a bucket wheel sun gear 1001 is fixedly provided on the first shaft 3 passing through the first support frame 5, the bucket wheel sun gear 1001 is located inside the first support frame 5, a bucket wheel planet gear 1002 is provided on an outer circumference of the bucket wheel sun gear 1001, the bucket wheel planet gear 1002 is engaged with the bucket wheel sun gear 1001, and the bucket wheel planet gear 1002 and the bucket wheel sun gear 1001 constitute a bucket wheel planet gear set 10; the bucket wheel sun gear 1001 is adjacently provided with a third support frame 11; a bucket wheel planet gear shaft 14 is fixedly provided in the middle of the bucket wheel planet gear 1002, the inside of the bucket wheel planet gear shaft 14 is a hollow structure, the bucket wheel planet gear shaft 14 passes through the third support frame 11, the bucket wheel planet gear shaft 14 is rotatably connected to the third support frame 11, a bucket wheel 901 is fixedly provided on the bucket wheel planet gear shaft 14 passing through the third support frame 11, the bucket wheel 901 is located between the second support frame 8 and the third support frame 11, and the bucket wheels 901 fixedly provided on a plurality of the bucket wheel planet gear shafts 14 constitute a bucket wheel set 9; a planet gear shaft 12 is fixedly provided in the middle of the first planet gear 402, the planet gear shaft 12 passes through the first support frame 5, the hollow bucket wheel planet gear shaft 14 and the second support frame 8, the planet gear shaft 12 is rotatably connected to the first support frame 5 and the second support frame 8 respectively, and the planet gear shaft 12 passing through the first support frame 5, the hollow bucket wheel planet gear shaft 14 and the second support frame 8 is fixedly connected to the second planet gear 702.

In this embodiment, the continuously variable transmission is provided with the outer housing 1, the intermediate housing 101 is provided in the middle of the outer housing 1, the first end cover 102 and the second end cover 103 are respectively provided on both sides of the intermediate housing 101, the inside of the intermediate housing 101 is a cavity structure, and the cavity inside the intermediate housing 101 and insides of the first end cover 102 and the second end cover 103 form an inner cavity 2. The continuously variable transmission itself has performances of revolution and rotation, and the revolution of the continuously variable transmission can be controlled by applying a braking force to the outer housing 1. The outer housing 1 can be used as a control end for controlling and adjusting the transmission performance of the continuously variable transmission. The first shaft 3, the second shaft 6 and the outer housing 1 can achieve mutual adjustment function. That is, any one of the first shaft 3, the second shaft 6 and the outer housing 1 can be selected as the input end of power, and the remaining two can be used as the control ends for controlling the overall performance of the continuously variable transmission. For example, if the first shaft 3 is used as the input end of power, and the second shaft 6 is used as the output end of power, the outer housing 1 can be used as the third control end at this time. When the transmission torque capacity is insufficient, the outer housing 1 participates in braking as the third control end, which will greatly improve the transmission performance of the continuously variable transmission.

At the same time, the first shaft 3 and the second shaft 6 can be interchanged as the input end of power and the output end of power, and after interchanging, the continuously variable transmission will present different performances.

Figure 1:
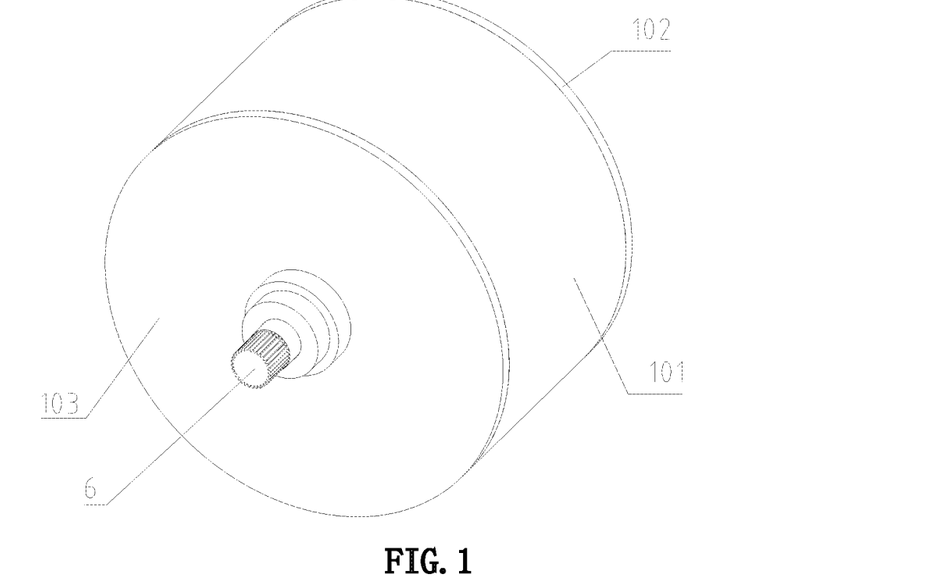
FIG. 1 is an axonometric view of Embodiment 1 of the present invention.
Figure 2:
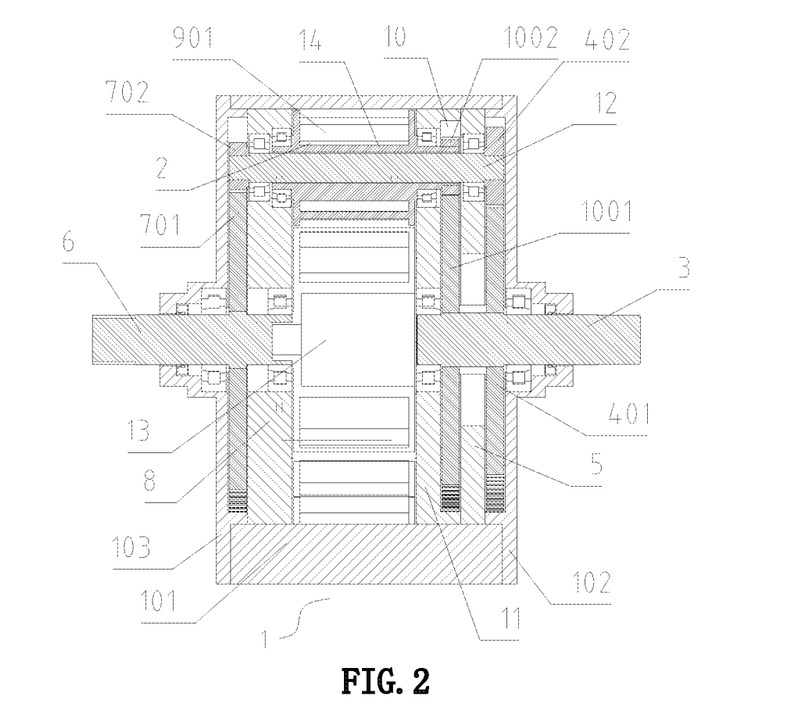
FIG. 2 is a section view of FIG. 1.

As can be seen in FIG. 2, the inside of the bucket wheel planet gear shaft 14 is a hollow structure. The bucket wheel planet gear shaft 14 and the bucket wheel 901 can be split structures to be fixedly connected, or can be made into an integrated structure (in this embodiment, an integrated structure). The planet gear shaft 12 passes through the hollow bucket wheel planet gear shaft 14, so that the overall structure is very compact. The overall size of the continuously variable transmission can be made very small, so as to be suitable for various applications. The inner cavity 2 is provided inside the outer housing 1 to form a closed cavity. An appropriate amount of oil can be filled in the intermediate housing 101, so that the engagement transmission inside the inner cavity 2 is oil-rich lubricated, which can reduce gear wear and noise.

Figure 3:
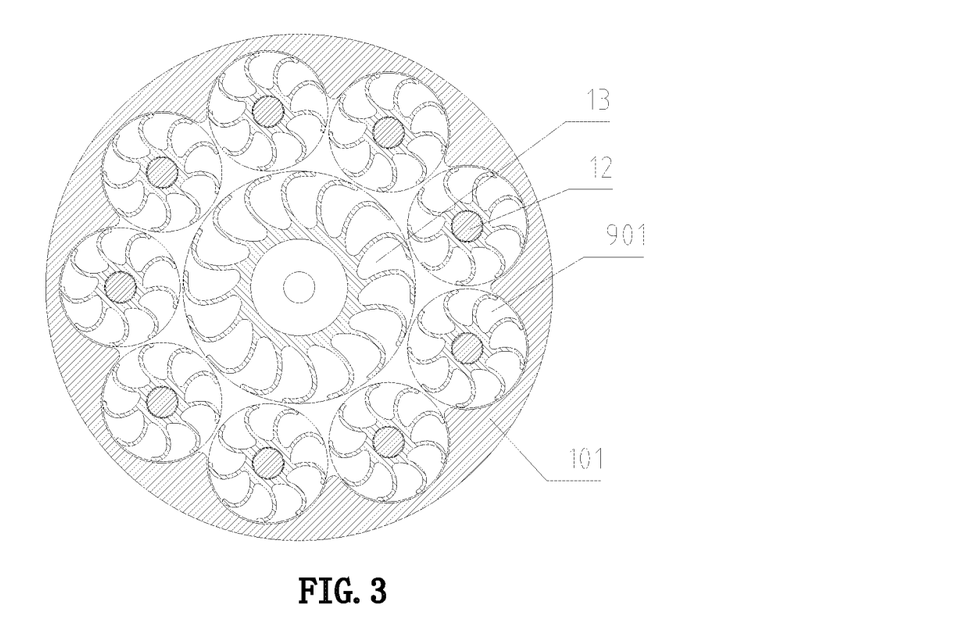
FIG. 3 is a section view of FIG. 2.
Figure 4:
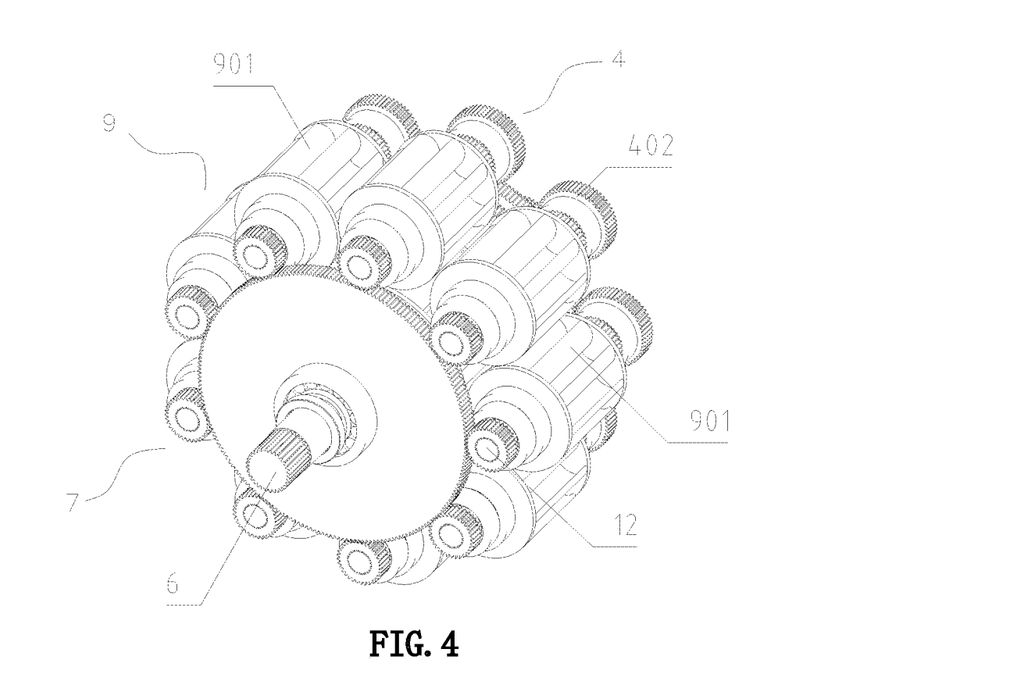
FIG. 4 is an axonometric view after removing an outer housing of Embodiment 1.
Figure 5:
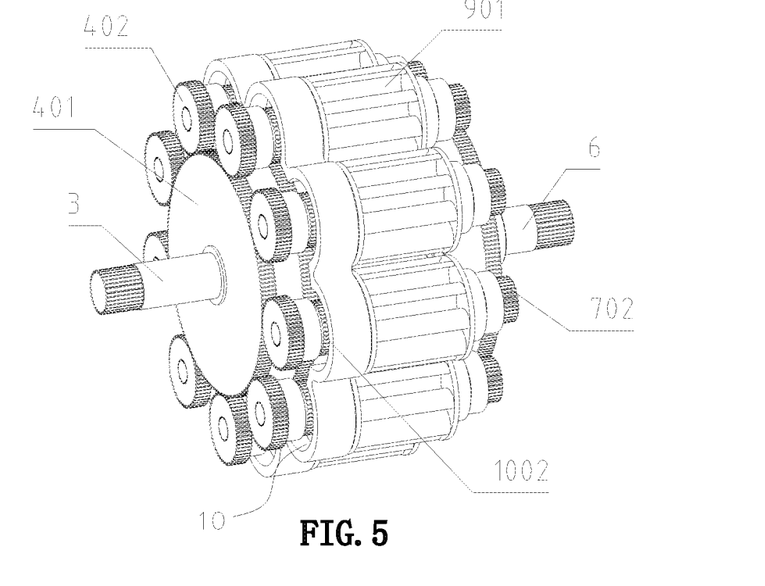
FIG. 5 is another axonometric view after removing an outer housing of Embodiment 1.
Figure 6:
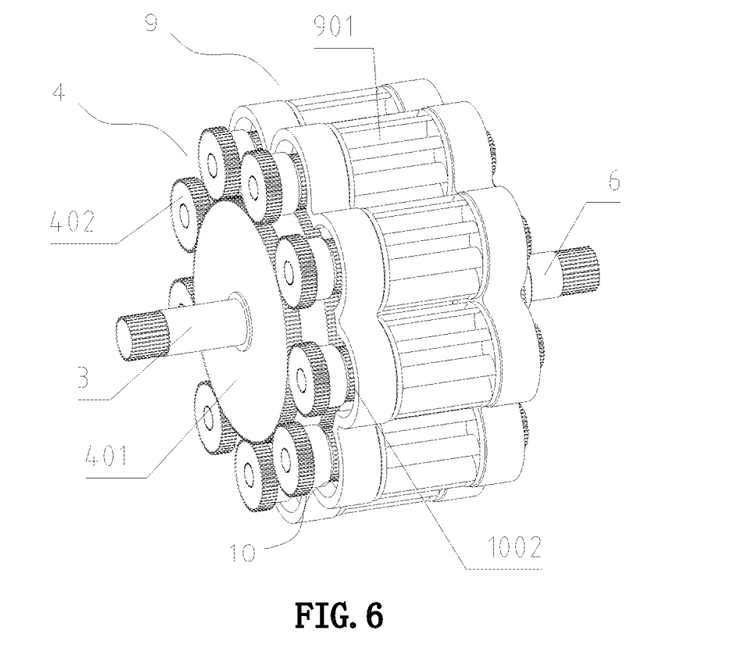
FIG. 6 is still another axonometric view after removing an outer housing of Embodiment 1.
Figure 7:
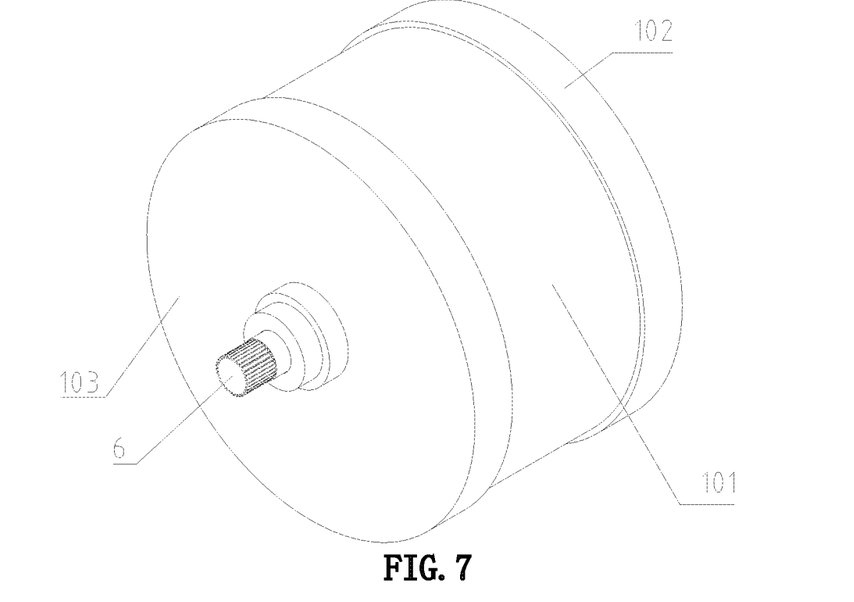
FIG. 7 is an axonometric view of Embodiment 2 of the present invention.

As can be seen in FIG. 3, a semicircular cavity is provided in a position corresponding to the bucket wheel 901 in an inner wall of the outer housing 1, and the bucket wheel 901 is located in the semicircular cavity. The bucket wheel 901 is located in the semicircular cavity in an inner wall of the outer housing 1, and the hydrodynamic force and the hydrodynamic viscous force of the bucket wheel 901 will exert more effective performance. The compact optimization of structure is achieved and the better performance is satisfied at the same time.

The operation process of the continuously variable transmission of this embodiment is as follows. When starting, the set power is input clockwise from the first shaft 3 to drive the first sun gear 401 to rotate clockwise. The first sun gear 401 drives the first planet gear 402 to rotate counterclockwise, and drives the second planet gear 702 to rotate through the fixedly connected planet gear shaft 12. The second sun gear 701 is subjected to a resistance from the second shaft 6, the second planet gear 702 revolves counterclockwise around the second sun gear 701, which drives the first support frame 5, the second support frame 8, the third support frame 11 and the outer housing 1 to revolve counterclockwise. At the same time, the first shaft 3 rotate clockwise, which drives the bucket wheel sun gear 1001 fixedly connected to the first shaft 3 to rotate clockwise. The bucket wheel planet gear 1002 rotates counterclockwise, thereby driving the bucket wheel 901 to rotate counterclockwise. The bucket wheel 901 is located in the semicircular cavity of an inner wall of the outer housing 1, and when rotating counterclockwise, the bucket wheel 901 is subjected to a resistance of the oil in the intermediate housing 101 to form a torque. This resistance includes hydrodynamic gravity formed by the revolution of the intermediate housing 101, hydrodynamic force due to oil injection from the bucket wheel 901 to the adjacent bucket wheel 901, and hydrodynamic viscous force of oil between the bucket wheel 901 and the semicircular cavity of the inner wall of the outer housing 1. The resistance torque formed by the bucket wheel 901 is simultaneously transmitted to the first support frame 5, the second support frame 8 and the third support frame 11. The second planet gear 702 forms a torque that prevents the revolution caused by the resistance of the second shaft 6, thereby driving the second planet gear 702 to exert force on the second sun gear 701. The second sun gear 701 drives the second shaft 6 to output power. The resistance of the oil to the bucket wheel 901 starts at 0, and increases exponentially as the speed of the first shaft 3 increases. The second sun gear 701 drives the second shaft 6 to rotate, thereby outputting power through the second shaft 6.

At the initial stage of starting in the above process of Embodiment 1, the continuously variable transmission starts at zero-speed and zero-torque. At the middle stage of starting, the resistance to the bucket wheel set 9 increases rapidly, and the resistance finally acts on the first support frame 5, the second support frame 8 and the third support frame 11, and also acts on the intermediate housing 101. When the input is in a low rotation speed state, the resistance provided by the bucket wheel 901 is insufficient, and the output torque is unsatisfactory, the braking control is applied to any one of the first end cover 102, the second end cover 103 and the intermediate housing 101 of the outer housing 1. The revolution of the outer housing 1 is prevented by a braking force, which can reduce the dependence on the resistance provided by the bucket wheel 901 and increase the output torque of the continuously variable transmission. When the outer housing 1 is in half braking, the continuously variable transmission achieves the continuously variable speed function. When the outer housing 1 is in full braking, the continuously variable transmission achieves the reducer function. When operating in the rated working condition, the speed and torque of the continuously variable transmission are relatively stable, the bucket wheel 901 is in a force balance state and will not rotate, and the mutual gears do not rotate, thereby achieving synchronous transmission of power as a whole, which is close to 1:1 transmission. The above various application forms are flexible, and application configurations in various fields can be achieved by setting different input ends, output ends and control ends.

This series of continuously variable transmission may select 3 or more first planet gears 402 and second planet gears 702. In this embodiment, there are nine first planet gears 402 and nine second planet gears 702. Different numbers of the first planet gears 402 and the second planet gears 702 can be set according to transmitted power and used size, so as to adapt to different application requirements. Generally, different numbers can be selected, such as 6, 9, 12, and the like.

As can be also seen in FIG. 3, a central bucket wheel 13 is fixedly provided on the first shaft 3 or the second shaft 6, and is located between the second support frame 8 and the third support frame 11. Providing the central bucket wheel 13 can adjust the operation mode of the oil in the inner cavity 2 and adjust the operation performance.

Embodiment 2

FIGS. 7-12 show another embodiment of a continuously variable transmission of the present invention. The continuously variable transmission is provided with an outer housing 1, an intermediate housing 101 is provided in the middle of the outer housing 1, a first end cover 102 and a second end cover 103 are respectively provided on both sides of the intermediate housing 101, the inside of the intermediate housing 101 is a cavity structure, and the cavity inside the intermediate housing 101 and insides of the first end cover 102 and the second end cover 103 form an inner cavity 2; a first shaft 3 penetrates in the middle of the first end cover 102, the first shaft 3 is rotatably connected to the first end cover 102, a first gear ring 401A is fixedly provided on the first shaft 3, the first gear ring 401A is located inside the first end cover 102, the first gear ring 401A is adjacently provided with a first support frame 5, the first shaft 3 passes through the first support frame 5, the first shaft 3 is rotatably connected to the first support frame 5, a first planet gear 402 is provided inside an outer circumference of the first gear ring 401A, the first planet gear 402 is engaged with the first gear ring 401A, and the first planet gear 402 and the first gear ring 401A constitute a first planet gear set 4; a second shaft 6 penetrates in the middle of the second end cover 103, the second shaft 6 is rotatably connected to the second end cover 103, a second gear ring 701A is fixedly provided on the second shaft 6, the second gear ring 701A is located inside the second end cover 103, the second gear ring 701A is adjacently provided with a second support frame 8, a second planet gear 702 is provided inside an outer circumference of the second gear ring 701A, the second planet gear 702 is engaged with the second gear ring 701A, and the second planet gear 702 and the second gear ring 701A constitute a second planet gear set 7; a bucket wheel sun gear 1001 is fixedly provided on the first shaft 3 passing through the first support frame 5, the bucket wheel sun gear 1001 is located inside the first support frame 5, a bucket wheel planet gear 1002 is provided on an outer circumference of the bucket wheel sun gear 1001, the bucket wheel planet gear 1002 is engaged with the bucket wheel sun gear 1001, and the bucket wheel planet gear 1002 and the bucket wheel sun gear 1001 constitute a bucket wheel planet gear set 10; the bucket wheel sun gear 1001 is adjacently provided with a third support frame 11; a bucket wheel planet gear shaft 14 is fixedly provided in the middle of the bucket wheel planet gear 1002, the inside of the bucket wheel planet gear shaft 14 is a hollow structure, the bucket wheel planet gear shaft 14 passes through the third support frame 11, the bucket wheel planet gear shaft 14 is rotatably connected to the third support frame 11, a bucket wheel 901 is fixedly provided on the bucket wheel planet gear shaft 14 passing through the third support frame 11, the bucket wheel 901 is located between the second support frame 8 and the third support frame 11, and the bucket wheels 901 fixedly provided on a plurality of the bucket wheel planet gear shafts 14 constitute a bucket wheel set 9; a planet gear shaft 12 is fixedly provided in the middle of the first planet gear 402, the planet gear shaft 12 passes through the first support frame 5, the hollow bucket wheel planet gear shaft 14 and the second support frame 8, the planet gear shaft 12 is rotatably connected to the first support frame 5 and the second support frame 8 respectively, and the planet gear shaft 12 passing through the first support frame 5, the hollow bucket wheel planet gear shaft 14 and the second support frame 8 is fixedly connected to the second planet gear 702.

Figure 8:
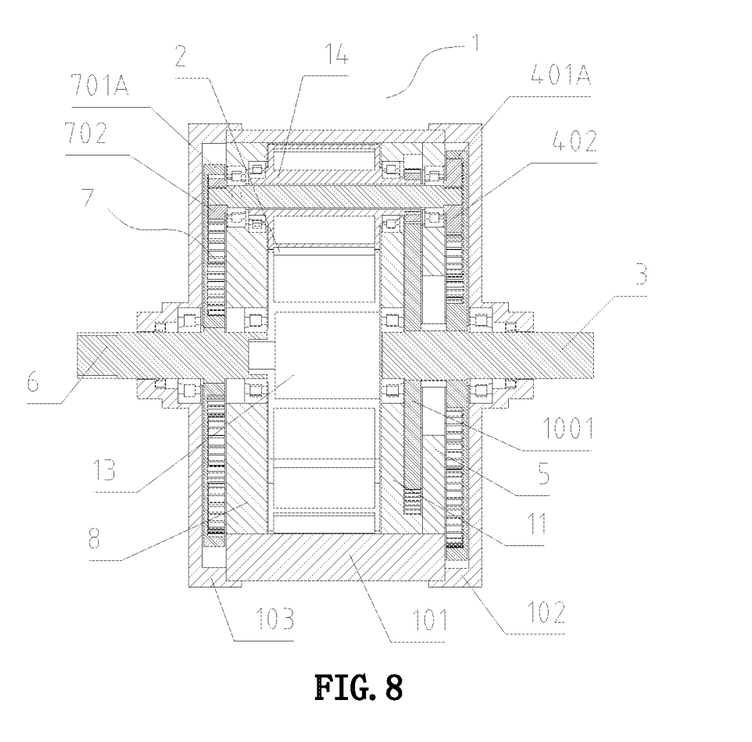
FIG. 8 is a section view of FIG. 7.
Figure 9:
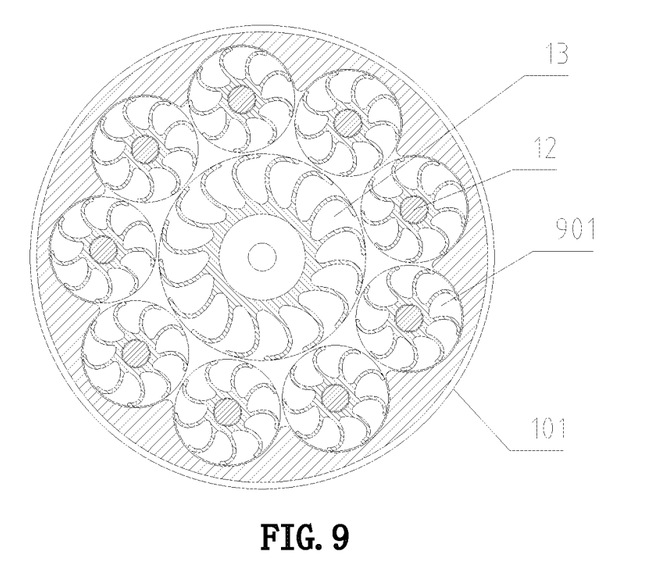
FIG. 9 is a section view of FIG. 8.
Figure 10:
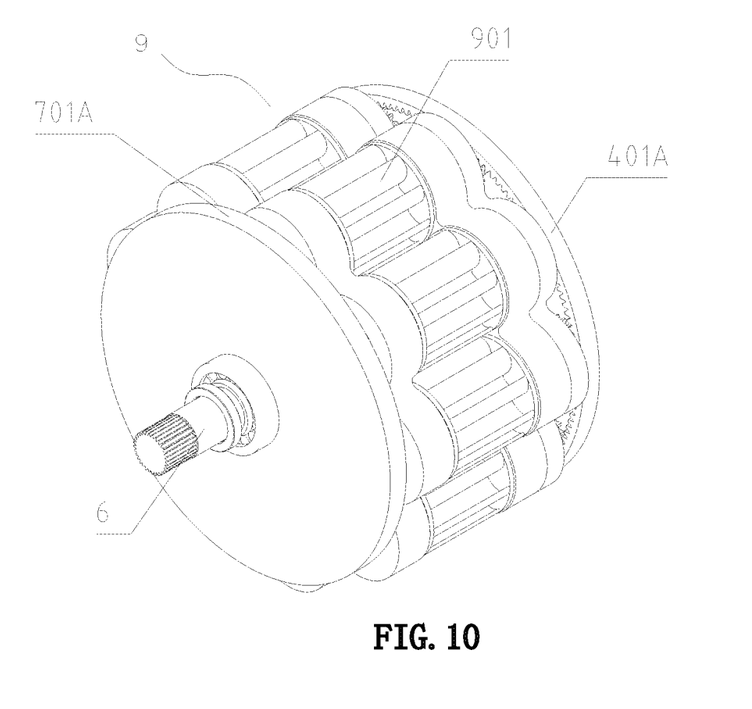
FIG. 10 is an axonometric view after removing an outer housing of Embodiment 2.
Figure 11:
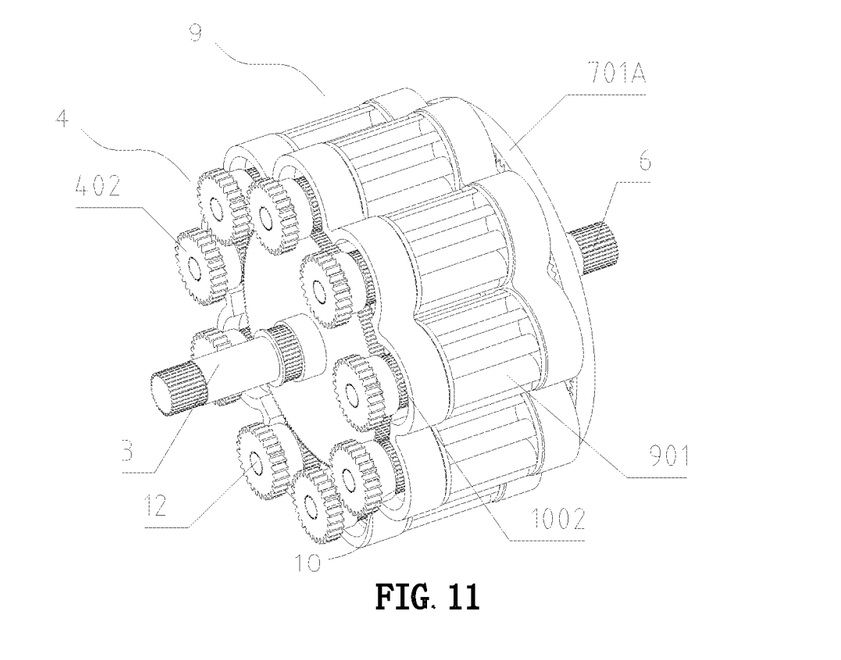
FIG. 11 is another axonometric view after removing an outer housing of Embodiment 2.
Figure 12:
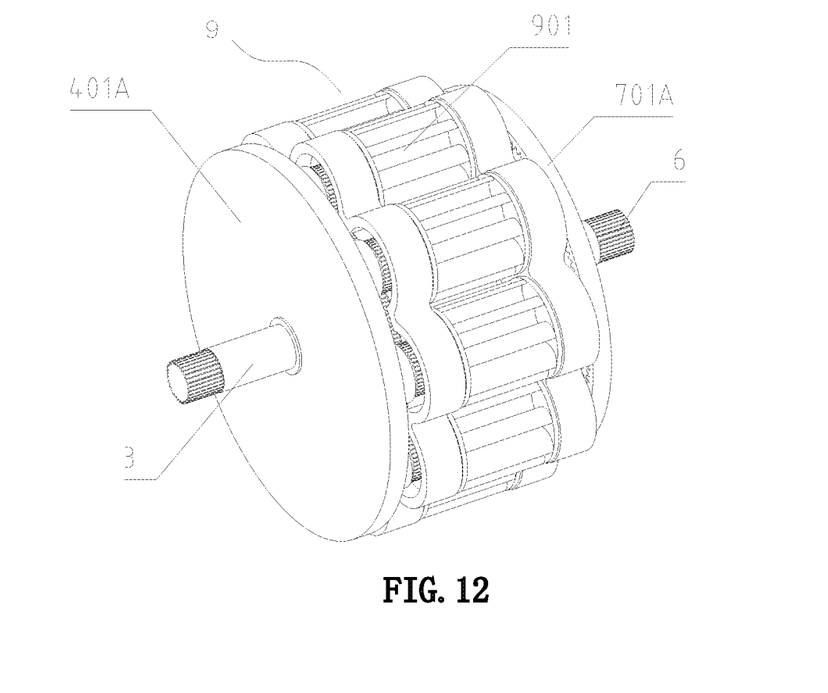
FIG. 12 is still another axonometric view after removing an outer housing of Embodiment 2.

As can be seen in FIG. 8, the differences from Embodiment 1 are in that the first sun gear 401 in Embodiment 1 is replaced with the first gear ring 401A in this embodiment, and the second sun gear 701 in Embodiment 1 is replaced with the second gear ring 701A in this embodiment. When the power is input from the first shaft 3 or the second shaft 6, since the outer diameters of the first gear ring 401A and the second gear ring 701A are larger than those of the first sun gear 401 and the second sun gear 701, the transmitted torque is large, and the efficiency of engagement transmission between the gear ring and the planet gear is higher than that between the sun gear and the planet gear, which can well improve the power transmission performance of the continuously variable transmission, and is more suitable for field applications that need to transmit greater power and torque.

It has been verified by test that, this embodiment increases the torque transmission capacity by about 40%, while reducing the damage of centrifugal force of the first planet gear 402 and the second planet gear 702 during operation. At the same time, the lubrication performance is better, and the application of different working conditions of the continuously variable transmission can be satisfied.

Embodiment 3

With reference to FIGS. 2 and 3, a continuously variable transmission is provided with an outer housing 1, an intermediate housing 101 is provided in the middle of the outer housing 1, a first end cover 102 and a second end cover 103 are respectively provided on both sides of the intermediate housing 101, the inside of the intermediate housing 101 is a cavity structure, and the cavity inside the intermediate housing 101 and insides of the first end cover 102 and the second end cover 103 form an inner cavity 2; a first shaft 3 penetrates in the middle of the first end cover 102, the first shaft 3 is rotatably connected to the first end cover 102, a first sun gear 401 is fixedly provided on the first shaft 3, the first sun gear 401 is located inside the first end cover 102, the first sun gear 401 is adjacently provided with a first support frame 5, the first shaft 3 passes through the first support frame 5, and the first shaft 3 is rotatably connected to the first support frame 5; a first planet gear 402 is provided on an outer circumference of the first sun gear 401, the first planet gear 402 is engaged with the first sun gear 401, and the first planet gear 402 and the first sun gear 401 constitute a first planet gear set 4; a second shaft 6 penetrates in the middle of the second end cover 103, the second shaft 6 is rotatably connected to the second end cover 103, a second gear ring 701A is fixedly provided on the second shaft 6, the second gear ring 701A is located inside the second end cover 103, the second gear ring 701A is adjacently provided with a second support frame 8, a second planet gear 702 is provided inside an outer circumference of the second gear ring 701A, the second planet gear 702 is engaged with the second gear ring 701A, and the second planet gear 702 and the second gear ring 701A constitute a second planet gear set 7; a bucket wheel sun gear 1001 is fixedly provided on the first shaft 3 passing through the first support frame 5, the bucket wheel sun gear 1001 is located inside the first support frame 5, a bucket wheel planet gear 1002 is provided on an outer circumference of the bucket wheel sun gear 1001, the bucket wheel planet gear 1002 is engaged with the bucket wheel sun gear 1001, and the bucket wheel planet gear 1002 and the bucket wheel sun gear 1001 constitute a bucket wheel planet gear set 10; the bucket wheel sun gear 1001 is adjacently provided with a third support frame 11; a bucket wheel planet gear shaft 14 is fixedly provided in the middle of the bucket wheel planet gear 1002, the inside of the bucket wheel planet gear shaft 14 is a hollow structure, the bucket wheel planet gear shaft 14 passes through the third support frame 11, the bucket wheel planet gear shaft 14 is rotatably connected to the third support frame 11, a bucket wheel 901 is fixedly provided on the bucket wheel planet gear shaft 14 passing through the third support frame 11, the bucket wheel 901 is located between the second support frame 8 and the third support frame 11, and the bucket wheels 901 fixedly provided on a plurality of the bucket wheel planet gear shafts 14 constitute a bucket wheel set 9; a planet gear shaft 12 is fixedly provided in the middle of the first planet gear 402, the planet gear shaft 12 passes through the first support frame 5, the hollow bucket wheel planet gear shaft 14 and the second support frame 8, the planet gear shaft 12 is rotatably connected to the first support frame 5 and the second support frame 8 respectively, and the planet gear shaft 12 passing through the first support frame 5, the hollow bucket wheel planet gear shaft 14 and the second support frame 8 is fixedly connected to the second planet gear 702.

Embodiment 4

With reference to FIGS. 2 and 3, a continuously variable transmission is provided with an outer housing 1, an intermediate housing 101 is provided in the middle of the outer housing 1, a first end cover 102 and a second end cover 103 are respectively provided on both sides of the intermediate housing 101, the inside of the intermediate housing 101 is a cavity structure, and the cavity inside the intermediate housing 101 and insides of the first end cover 102 and the second end cover 103 form an inner cavity 2; a first shaft 3 penetrates in the middle of the first end cover 102, the first shaft 3 is rotatably connected to the first end cover 102, a first gear ring 401A is fixedly provided on the first shaft 3, the first gear ring 401A is located inside the first end cover 102, the first gear ring 401A is adjacently provided with a first support frame 5, the first shaft 3 passes through the first support frame 5, the first shaft 3 is rotatably connected to the first support frame 5, a first planet gear 402 is provided inside an outer circumference of the first gear ring 401A, the first planet gear 402 is engaged with the first gear ring 401A, and the first planet gear 402 and the first gear ring 401A constitute a first planet gear set 4; a second shaft 6 penetrates in the middle of the second end cover 103, the second shaft 6 is rotatably connected to the second end cover 103, a second sun gear 701 is fixedly provided on the second shaft 6, the second sun gear 701 is located inside the second end cover 103, the second sun gear 701 is adjacently provided with a second support frame 8, a second planet gear 702 is provided on an outer circumference of the second sun gear 701, the second planet gear 702 is engaged with the second sun gear 701, and the second planet gear 702 and the second sun gear 701 constitute a second planet gear set 7; a bucket wheel sun gear 1001 is fixedly provided on the first shaft 3 passing through the first support frame 5, the bucket wheel sun gear 1001 is located inside the first support frame 5, a bucket wheel planet gear 1002 is provided on an outer circumference of the bucket wheel sun gear 1001, the bucket wheel planet gear 1002 is engaged with the bucket wheel sun gear 1001, and the bucket wheel planet gear 1002 and the bucket wheel sun gear 1001 constitute a bucket wheel planet gear set 10; the bucket wheel sun gear 1001 is adjacently provided with a third support frame 11; a bucket wheel planet gear shaft 14 is fixedly provided in the middle of the bucket wheel planet gear 1002, the inside of the bucket wheel planet gear shaft 14 is a hollow structure, the bucket wheel planet gear shaft 14 passes through the third support frame 11, the bucket wheel planet gear shaft 14 is rotatably connected to the third support frame 11, a bucket wheel 901 is fixedly provided on the bucket wheel planet gear shaft 14 passing through the third support frame 11, the bucket wheel 901 is located between the second support frame 8 and the third support frame 11, and the bucket wheels 901 fixedly provided on a plurality of the bucket wheel planet gear shafts 14 constitute a bucket wheel set 9; a planet gear shaft 12 is fixedly provided in the middle of the first planet gear 402, the planet gear shaft 12 passes through the first support frame 5, the hollow bucket wheel planet gear shaft 14 and the second support frame 8, the planet gear shaft 12 is rotatably connected to the first support frame 5 and the second support frame 8 respectively, and the planet gear shaft 12 passing through the first support frame 5, the hollow bucket wheel planet gear shaft 14 and the second support frame 8 is fixedly connected to the second planet gear 702. A semicircular cavity is provided in a position corresponding to the bucket wheel in an inner wall of the outer housing 1, and the bucket wheel 901 is located in the semicircular cavity.

The differences between Embodiments 3, 4 and Embodiments 1, 2 are in that, the first sun gear 401 or the second sun gear 701 corresponding to one end of the first shaft 3 or one end of the second shaft 6 can be replaced with the first gear ring 401A or the second gear ring 701A. The benefits of such design are in that, different transmission ratios can be flexibly set, so as to satisfy power transmission requirements of various different occasions.

The above are only the specific embodiments of the present invention, and the scope of the present invention is not limited thereto, and thus the replacement of the equivalent components thereof, or the equivalent changes and modifications made according to the claimed scope of the present invention should still fall within the scope encompassed by the claims of the present invention.

What is claimed is:
1. A continuously variable transmission provided with an outer housing, characterized in that, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity;

a first shaft penetrates in the middle of the first end cover, the first shaft is rotatably connected to the first end cover, a first sun gear is fixedly provided on the first shaft, the first sun gear is located inside the first end cover, the first sun gear is adjacently provided with a first support frame, the first shaft, passes through the first support frame, and the first shaft is rotatably connected to the first support frame; a first planet gear is provided on an outer circumference of the first sun gear, the first planet gear is engaged with the first sun gear, and the first planet gear and the first sun gear constitute a first planet gear set;

a second shaft penetrates in the middle of the second end cover, the second shaft is rotatably connected to the second end cover, a second sun gear is fixedly provided on the second shaft, the second sun gear is located inside the second end cover, the second sun gear is adjacently provided with a second support frame, a second planet gear is provided on an outer circumference of the second sun gear, the second planet gear is engaged with the second sun gear, and the second planet gear and the second sun gear constitute a second planet gear set;

a bucket wheel sun gear is fixedly provided on the first shaft passing through the first support frame, the bucket wheel sun gear is located inside the first support frame, a bucket wheel planet gear is provided on an outer circumference of the bucket wheel sun gear, the bucket wheel planet gear is engaged with the bucket wheel sun gear, and the bucket wheel planet gear and the bucket wheel sun gear constitute a bucket wheel planet gear set;

the bucket wheel sun gear is adjacently provided with a third support frame; a bucket wheel planet gear shaft is fixedly provided in the middle of the bucket wheel planet gear, the inside of the bucket wheel planet gear shaft is a hollow structure, the bucket wheel planet gear shaft passes through the third support frame, the bucket wheel planet gear shaft is rotatably connected to the third support frame, a bucket wheel is fixedly provided on the bucket wheel planet gear shaft passing through the third support frame, the bucket wheel is located between the second support frame and the third support frame, and a plurality of bucket wheels fixedly provided on a plurality of the bucket wheel planet gear shafts constitute a bucket wheel set;

a planet gear shaft is fixedly provided in the middle of the first planet gear, the planet gear shaft passes through the first support frame, the hollow bucket wheel planet gear shaft and the second support frame, the planet gear shaft is rotatably connected to the first support frame and the second support frame respectively, and the planet gear shaft passing through the first support frame, the hollow bucket wheel planet gear shaft and the second support frame is fixedly connected to the second planet gear.

2. The continuously variable transmission according to claim 1, characterized in that, there are 3 or more first planet gears.

3. The continuously variable transmission according to claim 1, characterized in that; there are 3 or more second planet gears.

4. The continuously variable transmission according to claim characterized in that, a central bucket wheel is fixedly provided on the first shaft or the second shaft, and the central bucket wheel is located between the second support frame and the third support frame.

5. A continuously variable transmission provided with an outer housing, characterized in that, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity;

a first shaft penetrates in the middle of the first end cover, the first shaft is rotatably connected to the first end cover, a first gear ring is fixedly provided on the first shaft, the first gear ring is located inside the first end cover, the first gear ring is adjacently provided with a first support frame; the first shaft passes through the first support frame, the first shaft is rotatably connected to the first support frame, a first planet gear is provided inside an outer circumference of the first gear ring, the first planet gear is engaged with the first gear ring, and the first planet gear and the first gear ring constitute a first planet gear set;

a second shaft penetrates in the middle of the second end cover, the second shaft is rotatably connected to the second end cover, a second gear ring is fixedly provided on the second shaft, the second gear ring is located inside the second end cover, the second gear ring is adjacently provided with a second support frame, a second planet gear is provided inside an outer circumference of the second gear ring, the second planet gear is engaged with the second gear ring, and the second planet gear and the second gear ring constitute a second planet gear set;

a bucket wheel sun gear is fixedly provided on the first shaft passing through the first support frame, the bucket wheel sun gear is located inside the first support frame, a bucket wheel planet gear is provided on an outer circumference of the bucket wheel sun gear, the bucket wheel planet gear is engaged with the bucket wheel sun gear, and the bucket wheel planet gear and the bucket wheel sun gear constitute a bucket wheel planet gear set;

the bucket wheel sun gear is adjacently provided with a third support frame; a bucket wheel planet gear shaft is fixedly provided in the middle of the bucket wheel planet gear, the inside of the bucket wheel planet gear shaft is a hollow structure, the bucket wheel planet gear shaft passes through the third support frame, the bucket wheel planet gear shaft is rotatably connected to the third support frame, a bucket wheel is fixedly provided on the bucket wheel planet gear shaft passing through the third support frame, the bucket wheel is located between the second support frame and the third support frame, and a plurality of bucket wheels fixedly provided on a plurality of the bucket wheel planet gear shafts constitute a bucket wheel set;

a planet gear shaft is fixedly provided in the middle of the first planet gear, the planet gear shaft passes through the first support frame, the hollow bucket wheel planet gear shaft and the second support frame, the planet gear shaft is rotatably connected to the first support frame and the second support frame respectively, and the planet gear shaft passing through the first support frame, the hollow bucket wheel planet gear shaft and the second support frame is fixedly connected to the second planet gear.

6. A continuously variable transmission provided with an outer housing, characterized in that, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity;

a first shaft penetrates in the middle of the first end cover, the first shaft is rotatably connected to the first end cover, a first sun gear is fixedly provided on the first shaft, the first sun gear is located inside the first end cover, the first sun gear is adjacently provided with a first support frame, the first shaft passes through the first support frame, and the first shaft is rotatably connected to the first support frame; a first planet gear is provided on an outer circumference of the first sun gear, the first planet gear is engaged with the first sun gear, and the first planet gear and the first sun gear constitute a first planet gear set;

a second shaft penetrates in the middle of the second end cover, the second shaft is rotatably connected to the second end cover, a second gear ring is fixedly provided on the second shaft, the second gear ring is located inside the second end cover, the second gear ring is adjacently provided with a second support frame, a second planet gear is provided inside an outer circumference of the second gear ring, the second planet gear is engaged with the second gear ring, and the second planet gear and the second gear ring constitute a second planet gear set;

a bucket wheel sun gear is fixedly provided on the first shaft passing through the first support frame, the bucket wheel sun gear is located inside the first support frame, a bucket wheel planet gear is provided on an outer circumference of the bucket wheel sun gear, the bucket wheel planet gear is engaged with the bucket wheel sun gear, and the bucket wheel planet gear and the bucket wheel sun gear constitute a bucket wheel planet gear set;

the bucket wheel sun gear is adjacently provided with a third support frame; a bucket wheel planet gear shaft is fixedly provided in the middle of the bucket wheel planet gear, the inside of the bucket wheel planet gear shaft is a hollow structure; the bucket wheel planet gear shaft passes through the third support frame, the bucket wheel planet gear shaft is rotatably connected to the third support frame, a bucket wheel is fixedly provided on the bucket wheel planet gear shaft passing through the third support frame, the bucket wheel is located between the second support frame and the third support frame, and a plurality of bucket wheels fixedly provided on a plurality of the bucket wheel planet gear shafts constitute a bucket wheel set;

a planet gear shaft is fixedly provided in the middle of the first planet gear, the planet gear shaft passes through the first support frame, the hollow bucket wheel planet gear shaft and the second support frame, the planet gear shaft is rotatably connected to the first support frame and the second support frame respectively, and the planet gear shaft passing through the first support frame, the hollow bucket wheel planet gear shaft and the second support frame is fixedly connected to the second planet gear.

7. A continuously variable transmission provided with an outer housing, characterized in that, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity;

a first shaft penetrates in the middle of the first end cover, the first shaft is rotatably, connected to the first end cover, a first gear ring is fixedly provided on the first shaft, the first gear ring is located inside the first end cover, the first gear ring is adjacently provided with a first support frame, the first shaft passes through the first support frame, the first shaft is rotatably connected to the first support frame, a first planet gear is provided inside an outer circumference of the first gear ring, the first planet gear is engaged with the first gear ring, and the first planet gear and the first gear ring constitute a first planet gear set;

a second shaft penetrates in the middle of the second end cover, the second shaft is rotatably connected to the second end cover, a second sun gear is fixedly provided on the second shaft, the second sun gear is located inside the second end cover, the second sun gear is adjacently provided with a second support frame, a second planet gear is provided on an outer circumference of the second sun gear, the second planet gear is engaged with the second sun gear, and the second planet gear and the second sun gear constitute a second planet gear set;

a bucket wheel sun gear is fixedly provided on the first shaft passing through the first support frame, the bucket wheel sun gear is located inside the first support frame, a bucket wheel planet gear is provided on an outer circumference of the bucket wheel sun gear, the bucket wheel planet gear is engaged with the bucket wheel sun gear, and the bucket wheel planet gear and the bucket wheel sun gear constitute a bucket wheel planet gear set;

the bucket wheel sun gear is adjacently provided with a third support frame; a bucket wheel planet gear shaft is fixedly provided in the middle of the bucket wheel planet gear, the inside of the bucket wheel planet gear shaft is a hollow structure, the bucket wheel planet gear shaft passes through the third support frame, the bucket wheel planet gear shaft is rotatably connected to the third support frame, a bucket wheel is fixedly provided on the bucket wheel planet gear shaft passing through the third support frame, the bucket wheel is located between the second support frame and the third support frame, and a plurality of bucket wheels fixedly provided on a plurality of the bucket wheel planet gear shafts constitute a bucket wheel set;

a planet gear shaft is fixedly provided in the middle of the first planet gear, the planet gear shaft passes through the first support frame, the hollow bucket wheel planet gear shaft and the second support frame, the planet gear shaft is rotatably connected to the first support frame and the second support frame respectively, and the planet gear shaft passing through the first support frame, the hollow bucket wheel planet gear shaft and the second support frame is fixedly connected to the second planet gear.

* * * * *